(12) United States Patent
Schuller et al.

(10) Patent No.: US 11,269,819 B1
(45) Date of Patent: Mar. 8, 2022

(54) MANAGING CONSISTENCY MODELS IN A DISTRIBUTED DATABASE

(71) Applicant: Twittter, Inc., San Francisco, CA (US)

(72) Inventors: Peter Schuller, San Francisco, CA (US); Christopher Goffinet, San Francisco, CA (US); Boaz Avital, San Francisco, CA (US); Armond Bigian, San Francisco, CA (US); Spencer G. Fang, San Francisco, CA (US); Anthony Asta, San Francisco, CA (US)

(73) Assignee: Twittter, Inc., San Francisco, CA (US)

( * ) Notice: Subject to any disclaimer, the term of this patent is extended or adjusted under 35 U.S.C. 154(b) by 319 days.

(21) Appl. No.: 16/357,131

(22) Filed: Mar. 18, 2019

Related U.S. Application Data

(63) Continuation of application No. 14/575,476, filed on Dec. 18, 2014, now Pat. No. 10,235,333.

(Continued)

(51) Int. Cl.
| | |
|---|---|
| *G06F 16/21* | (2019.01) |
| *G06F 16/23* | (2019.01) |
| *G06F 16/27* | (2019.01) |
| *H04L 12/24* | (2006.01) |
| *H04L 12/927* | (2013.01) |
| *H04L 29/08* | (2006.01) |
| *H04L 41/5067* | (2022.01) |

(Continued)

(52) U.S. Cl.
CPC .......... *G06F 16/21* (2019.01); *G06F 16/2308* (2019.01); *G06F 16/2358* (2019.01); *G06F 16/2365* (2019.01); *G06F 16/2379* (2019.01); *G06F 16/27* (2019.01); *H04L 41/0896* (2013.01); *H04L 41/5067* (2013.01); *H04L 47/805* (2013.01); *H04L 67/1097* (2013.01)

(58) Field of Classification Search
CPC ...... G06F 16/21; G06F 16/27; G06F 16/2379; G06F 16/2308; G06F 16/2358; G06F 16/2365; H04L 41/0896; H04L 41/5067; H04L 47/805; H04L 67/1097
See application file for complete search history.

(56) References Cited

U.S. PATENT DOCUMENTS

| | | |
|---|---|---|
| 6,202,132 B1 | 3/2001 | Islam et al. |
| 9,053,167 B1 | 6/2015 | Swift et al. |

(Continued)

OTHER PUBLICATIONS curator.apache.org, "Client," (2015). Retrieved from the Internet on Jul. 23, 2015): http://curator.aoache.ora/curator-client/index.html.

(Continued)

*Primary Examiner* — Mark D Featherstone
*Assistant Examiner* — Ranjit P Doraiswamy
(74) *Attorney, Agent, or Firm* — Fish & Richardson P.C.

(57) ABSTRACT

Embodiments are provided for enabling a dynamic management of a multi-tenant distributed database. According to certain aspects, a management module supports an interface that enables a customer to configure one or more consistency models for a service to be supported by the distributed database. The management module may determine computing resources within the distributed database that are needed to support the service according to the configured consistency model(s), and may instantiate the computing resources for testing and development of the service by the customer.

27 Claims, 16 Drawing Sheets

Related U.S. Application Data

(60) Provisional application No. 61/978,689, filed on Apr. 11, 2014.

(51) Int. Cl.
    *H04L 47/80*     (2022.01)
    *H04L 41/0896*     (2022.01)
    *H04L 67/1097*     (2022.01)

(56) References Cited

U.S. PATENT DOCUMENTS

| | | | | |
|---|---|---|---|---|
| 9,201,897 | B1* | 12/2015 | Zeliger | G06F 16/1873 |
| 9,864,636 | B1 | 1/2018 | Patel et al. | |
| 10,235,333 | B1 | 3/2019 | Schuller et al. | |
| 2006/0195666 | A1 | 8/2006 | Maruyanna et al. | |
| 2011/0131309 | A1* | 6/2011 | Akiyama | H04L 12/14 709/223 |
| 2014/0101225 | A1 | 4/2014 | Abu-Libdeh et al. | |
| 2014/0101298 | A1 | 4/2014 | Shukla et al. | |
| 2016/0139841 | A1* | 5/2016 | Agetsuma | G06F 3/067 711/162 |

OTHER PUBLICATIONS curator.apache.org, "Error Handling," (2015). Retrieved from the Internet on Jul. 23, 2015: http://curator.apache.org/errors.html, 2 pages.

curator.apache.org, "Framework," (2015). Retrieved from the Internet on Jul. 23, 2015: http://curator.apache.orq/curator-framework/index.html.

curator.apache.org, "Recipes," (2015). Retrieved from the Internet on Jul. 23, 2015: URL: http://curator.apache.org/curatorrecipes/index.html.

curator.apache.org, "Utilities," (2015). Retrieved from the Internet on Jul. 23, 2015: http://curator.apache.orq/utilities.html.

curator.apache.org, "Welcome to Apache Curator," (2015). Retrieved from the Internet on Apr. 17, 2015: http://curator.apache.orq/.

data.linkedin.com, "Apache Helix," (2015). Retrieved from the Internet on Apr. 17, 2015: http://data.linkedin.com/opensource/helix, 3 pages.

* cited by examiner

Manhattan | Home | My Applications | Datasets | Help

Manhattan
Distributed storage at Twitter scale.

What is Manhattan? Manhattan is Core Storage's next generation distributed database that is self-service. We support static datasets generated from Hadoop and dynamic datasets with read-write support. Manhattan makes it easy to get that data in a location where everyone can access it.

[ Get started today ▷ ]

Self-service
Manhattan provides full self-service capabilities that allow you to get started fast and easy.

Alerting
We have direct integration with Koalabird, that means you get to take advantage of Twitter's powerful alerting system for your

Rate Limiting
Set your own rate limits, from read to write qps. This helps reduce bad actors from impacting your application performance.

Multi-datacenter
Stop worrying about how to build applications that support multi-datacenter. Manhattan provides this automatically for

Manhattan    Home  My Applications  Datasets                                    Help

What's your use-case?

We need to collect some information from you to get started. Help us understand your use case.

Static Data ─ 451

Do you have data that is static and can be generated using the power of Hadoop? Manhattan supports serving this static data out using our read-only clusters.

[ Select Read Only ▼ ]

Dynamic Data ─ 452

Do you have data that changes dynamically, such data might include tweets, and users? Manhattan supports serving this dynamic data out using our read-write clusters.

[ Select Read/Write ▼ ]

Manhattan　Home　My Applications　Datasets　　　　　　　　　　　　　　　Help

550

Clusters that exist in the Manhattan ecosystem

Multi-Tenant

These clusters are available to everyone within Twitter to use. They support the ability for multiple customers to run on the same hardware.

| Name | Description | Cluster Type | Datacenters | |
|---|---|---|---|---|
| Adama | This cluster is used for testing only. It's backed by (Solid State Storage) and isn't supposed to be used for production use | testing | smf1, atla, smfd | Select this cluster |
| Athena | This cluster is used for larger datasets (Solid State Storage) that require low-latency and high throughput. This is the recommended cluster | production recommended | smf1, atla | Select this cluster |
| Starbuck | This cluster is used for very small datasets (in-memory) that require low-latency and high throughput. All requests for in-memory storage must go through a manual approval process. | production | smf1, atla | Select this cluster |

FIG. 4B

Manhattan - New Application

Manhattan | Home | My Applications | Datasets | Reports | Capacity | Mission Control | Help

New Application using the Omega cluster

An application is a single use case that needs access to Manhattan. It can make requests to any dataset in the cluster on which it was created. It can also own its own datasets, which should have data directly related to the feature.

[ Give me an example? ]

General Information

Application Name (ID): [_____]  This is the name of your application, (eg. Metastore), it will act as the application that you will send with every request to Manhattan.

Description: [_____]  Description of your Application (eg: Metadata about users)

Core Hours: [◄►]

Manhattan - New Application

Manhattan  Home  My Applications  Datasets  Reports  Capacity  Mission Control  Help

554

Contact Information

Contact email: [          ]
An email address we can have on file if we need to contact your application for questions.

Oncall email: [          ]
This is an email address that we can send alerts or page (i.e., pagerduty) to ensure operational reliability for your application.

Alert DDS Team: [◄►]
When we create Koalabind alerts for your application we need you to pick your DDS team you would like them created under, so you can snooze alerts if you get paged.

Storage and Throughput Quotas

Storage (gigabytes): [(example: 500)]  Estimate the size of your data
How much storage do you need for your application in gigabytes

Peak keys written per second: [(example: 1000)]
This is the how many keys per second you need to write to Manhattan at peak normal traffic combined across all datacenters.

FIG. 5B

Manhattan - New Application

Manhattan   Home   My Applications   Datasets   Reports   Capacity   Mission Control

Storage and Throughput Quotas

Storage (gigabytes): (example: 500)
How much storage do you need for your application in gigabytes.

Peak keys written per second: (example: 1000)
This is the how many keys per second you need to write to Manhattan at peak normal traffic combined across all datacenters.

Peak partitioning keys read per second: (example: 1000)
This is the how many pkeys per second you need to read from Manhattan at peak normal traffic combined across all datacenters. E.g. if you need 3 key attributes from 100 pkey user ids every second, that's 100 pkeys/s.

Peak local keys read per second: (example: 2000)
This is the how many lkeys per second you need to read from Manhattan as peak normal traffic combined across all datacenters. E.g. if you need 3 key attributes from 100 pkey user ids every second, that's 300 lkeys/s.

Traffic Expectations

Will you be using a cache? No, all requests go straight to Manhat ▼

Manhattan - New Application

Manhattan  Home  My Applications  Datasets  Reports  Capacity  Mission Control  Help

Peak local keys read per second: (example: 2000)

This is the how many lkeys per second you need to read from Manhattan as peak normal traffic combined across all datacenters. E.g. if you need 3 key attributes from 100 pkey user ids every second, that's 300 lkeys/s. — 558

Traffic Expectations

Will you be using a cache? No, all requests go straight to Manhat

Abnormal spike pkeys read per second: (example: 10000)

This is how many pkeys per second you expect you might need from Manhattan across all datacenters during an abnormal event such as a partial cache failure. If you don't anticipate such an event, put the same number as above.

☐ I have latency requirements

☐ I am interested in using Check-And-Set (CAS)

Permissions

FIG. 5D

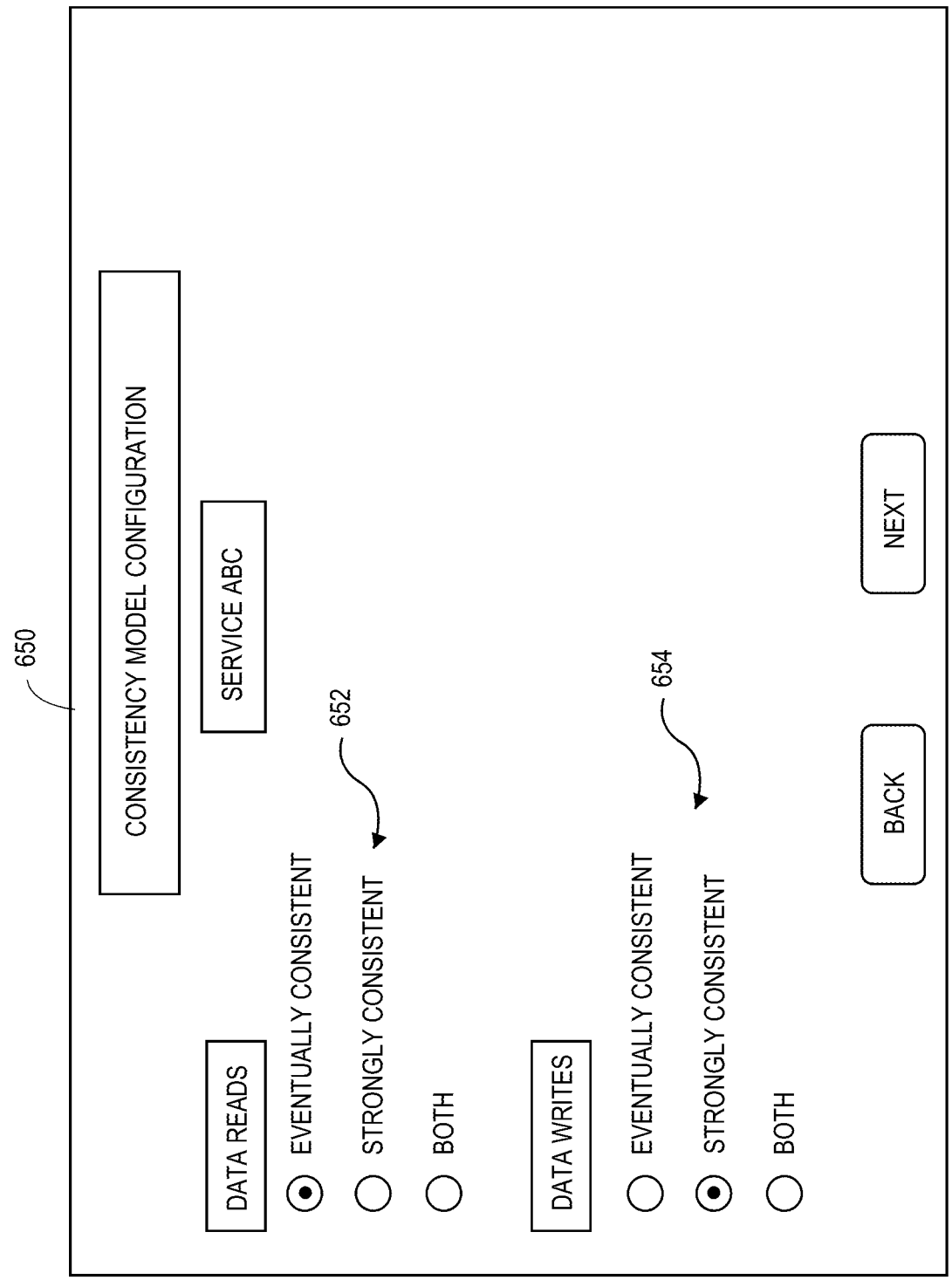

MANAGING CONSISTENCY MODELS IN A DISTRIBUTED DATABASE

CROSS-REFERENCE TO RELATED APPLICATIONS

This application is a continuation of and claims priority to U.S. Non-provisional patent application Ser. No. 14/575,476 filed on Dec. 18, 2014 which claims the benefit of U.S. Provisional Application No. 61/978,689, filed on Apr. 11, 2014, which are incorporated by reference herein in their entirety.

FIELD

The present disclosure generally relates to multi-tenant distributed databases and, more particularly, to implementations for configuring consistency models within a multi-tenant distributed database.

BACKGROUND

Distributed database systems include a plurality of storage devices spread among a network of interconnected computers. The distributed database systems typically have greater reliability and availability than parallel database systems, among other benefits. Various internet services, for example social networking services, employ distributed database systems to manage the storage and retrieval of information. Generally, the need to efficiently and accurately read and write data across the database system increases with a greater amount of information, a greater number of users, and stricter latency requirements.

A distributed database system generally supports a specific consistency model between the system and developers who use the system to test or implement services. When data is stored in a distributed system, the data must propagate among multiple computer resources or clusters before it has achieved replica convergence across the distributed system. A system having an "eventually consistent" model informally guarantees that, if no new updates are made to a given data item, eventually all accesses to that item will return the last updated value. In contrast, a system having a "strongly consistent" database requires that all resources or clusters have the same view of stored data. Conventional distributed database systems manage eventually consistent and strongly consistent applications by employing various open source frameworks. However, it is difficult to expand functionality across new resources of the system due to constraints of the frameworks and the need to reconfigure the frameworks, as well as the different resource requirements of the different consistency models. For instance, any modifications to a service configuration typically requires intervention, reconfiguration, and/or approval from a storage engineer.

Accordingly, there is an opportunity for techniques and frameworks to dynamically manage consistency model configurations within distributed databases.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts an example user interface associated with a multi-tenant distributed database in accordance with some embodiments.

FIG. 4A depicts an example user interface for configuring services for operation on a multi-tenant distributed database in accordance with some embodiments.

FIG. 4B depicts an example user interface for selecting resources of a multi-tenant distributed database in accordance with some embodiments.

FIGS. 5A-5D depict example user interfaces for initiating a service supported by a multi-tenant distributed database in accordance with some embodiments.

FIGS. 6A-6C depict example user interfaces for configuring a consistency model for a service supported by a multi-tenant distributed database in accordance with some embodiments.

DETAILED DESCRIPTION

According to the present embodiments, a multi-tenant distributed database as well as various built-in systems and methods of managing access thereto are disclosed. In one aspect, the distributed database is a multi-tenant system capable of concurrently serving multiple use cases of multiple customers according to various resource requirements and parameters. Conventional open source solutions support individual use cases or services for customers, whereby a certain set of resources is instantiated and dedicated for one service and another set of resources is instantiated and dedicated for another service. In contrast, the systems and methods may instantiate a requested amount of resources or clusters of the distributed database for a customer according to requirements of a service without having to build a dedicated system for the customer. The systems and methods therefore enable efficient and effective "self-service" use of the distributed database by multiple customers.

In embodiments, the distributed database supports multiple consistency model configurations for various customer services. Generally, an eventually consistent model enables the storage and retrieval of data without delay, but with the possibility of stale reads, and a strongly consistent model guarantees the latest update on a data read but with an increased latency. When a customer such as a developer wants to build or test a service using the distributed database, the systems and methods enable the customer to customize or configure various features related to one or more consistency models. In particular, the systems and methods enable the customer to specify one consistency model for data reads and another consistency model for data writes. Further, customers may specify time periods for when the service is to have various consistency models. Moreover, the systems and methods can leverage local data centers to guarantee accurate data reads without the normal latency of a strongly consistent data read. Additional features and their benefits are discussed herein.

Figure 1A:
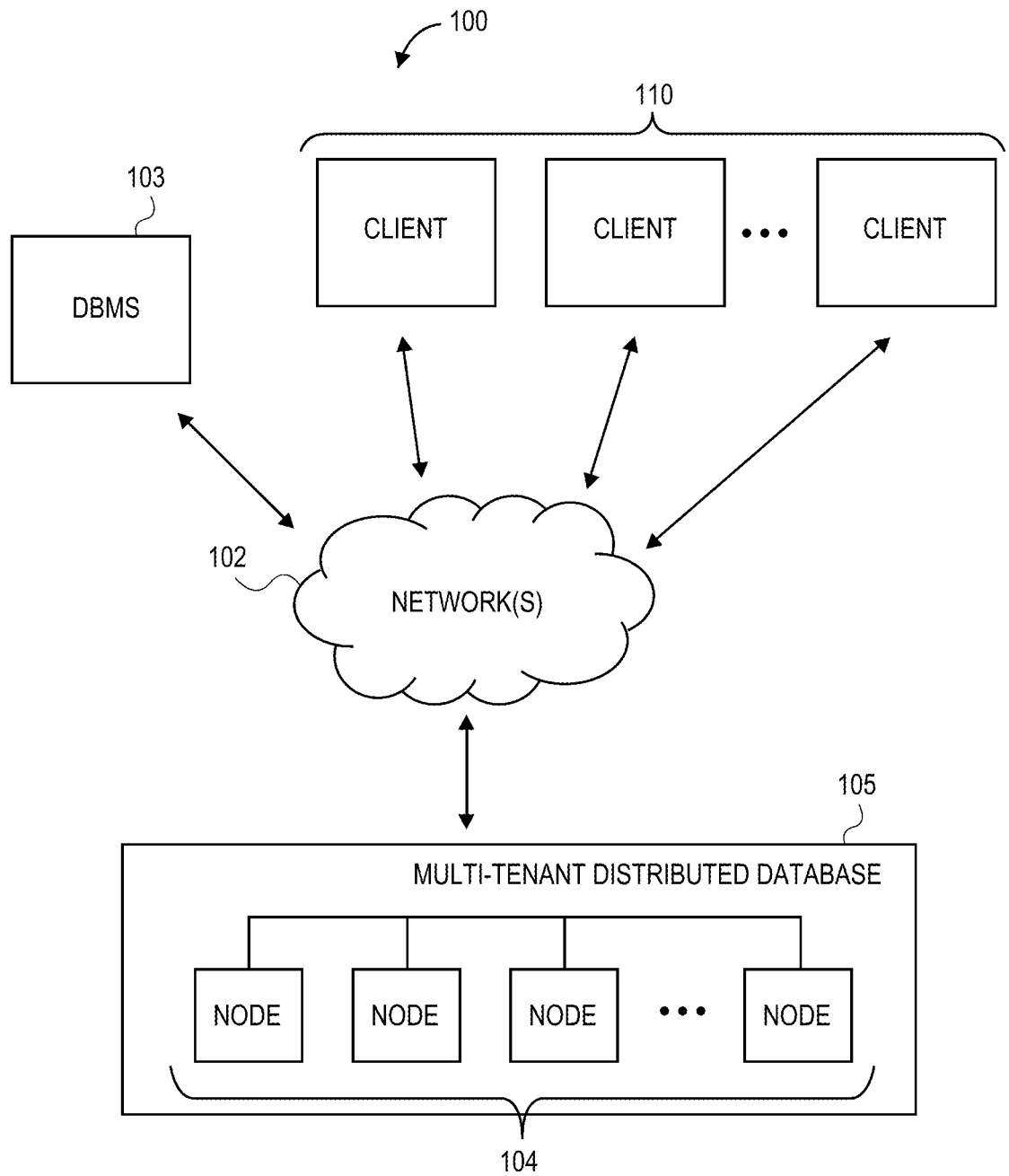
FIG. 1A depicts a system capable of implementing a multi-tenant distributed database in accordance with some embodiments.

FIG. 1A illustrates a general system architecture of a system 100 implementing a multi-tenant distributed database 105. The distributed database 105 may include multiple nodes 104 of storage devices or computer resources that are distributed across a plurality of physical computers, such as a network of interconnected computers. The multiple nodes 104 may be virtually or physically separated, and may be configured to interface with one or more processing units such as one or more CPUs. Each of the nodes 104 may store one or more replicas of one or more datasets, and may include one or more various types of storage devices (e.g., solid state drives (SSDs), platter storage such as hard disk drives, or other memory) and structures (e.g., SSTable, seadb, b-tree, or others). A distributed database management system (DBMS) 103 may be configured to manage the distributed database 105, whereby the DBMS 103 may be stored on a centralized computer within the system 100.

The system 100 further includes a plurality of clients 110 configured to access the distributed database 105 and features thereof via one or more networks 102. It should be appreciated that the network 102 may be any type of wired or wireless LAN, WAN, or the like. For example, the network 102 may be the Internet, or various corporate intranets or extranets. In embodiments, each of the plurality of clients 110 is a dedicated computer machine, workstation, or the like, including any combination of hardware and software components. Further, a user such as a developer, engineer, supervisor, or the like (generally, a "customer") may interface with any of the plurality of clients 110 to access the distributed database 105 and configure various services to be supported thereon. It should be appreciated that the plurality of clients 110 may also interface with the DBMS 103.

Figure 1B:
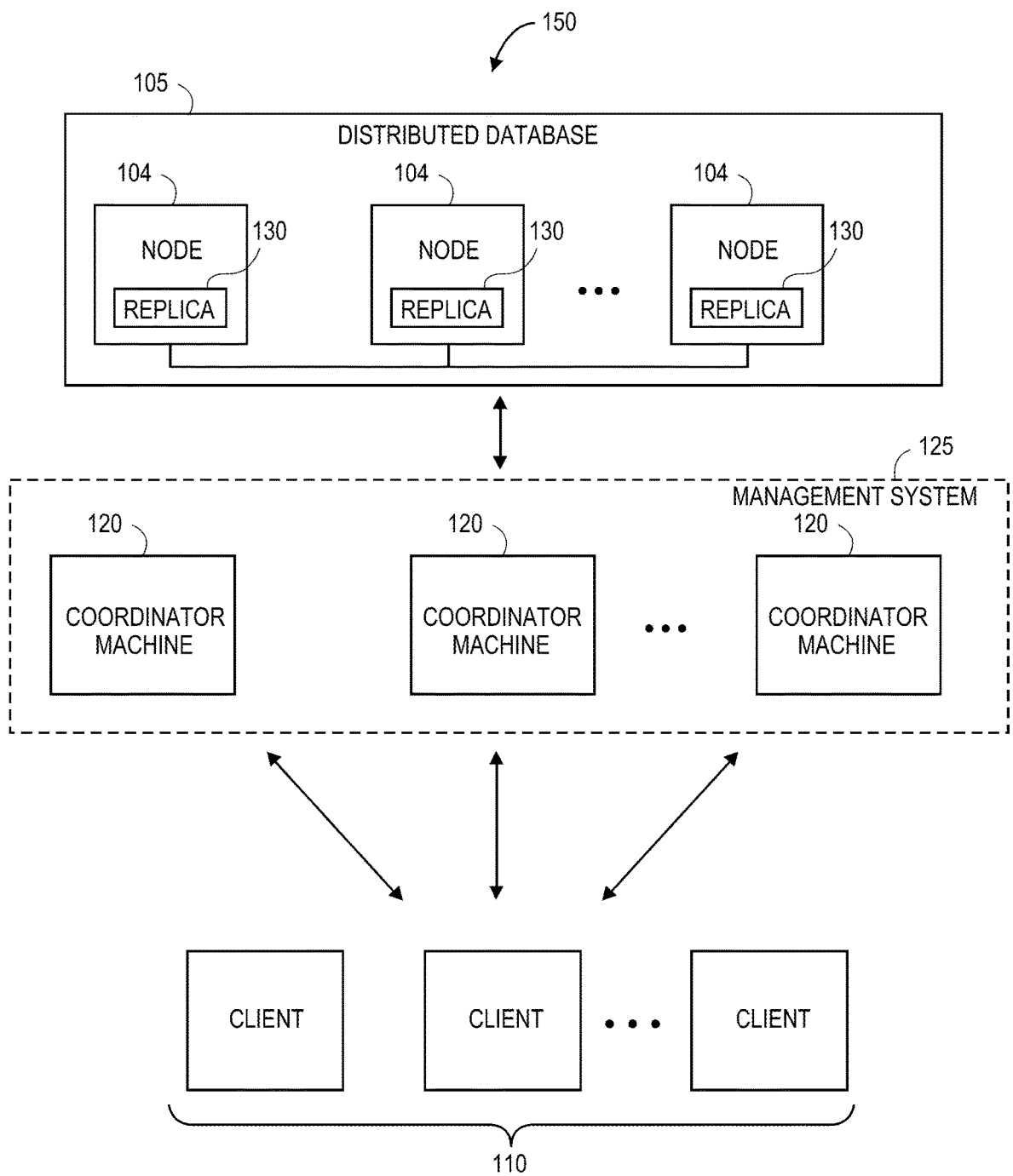
FIG. 1B depicts a detailed representation of various components configured to manage a multi-tenant distributed database in accordance with some embodiments.

FIG. 1B illustrates a system 150 having components capable of implementing the systems and methods of the present embodiments. The system 150 includes the distributed database 105 storing a plurality of nodes 104, as discussed with respect to FIG. 1A. Each of the nodes 104 may store one or more replica representations 130 of one or more datasets.

The system 150 further includes a management system 125, which may serve as or be separate from the DMBS 103 as discussed with respect to FIG. 1A. The management system 125 includes a plurality of coordinator machines 120 that may be distributed throughout various physical or virtual locations and may be configured to connect to one another. Each of the coordinator machines 120 may manage various services associated with storing and managing datasets within the distributed database 105. In one case, each of the coordinator machines 120 may manage one or more services to identify appropriate replica representations 130 and interface with the identified replica representations 130 for dataset storage and management. Customers may operate one or more of the clients 110 to interface with one or more of the coordinator machines 120, where the particular coordinator machine 120 is selected based on availability or other factors.

Figure 1C:
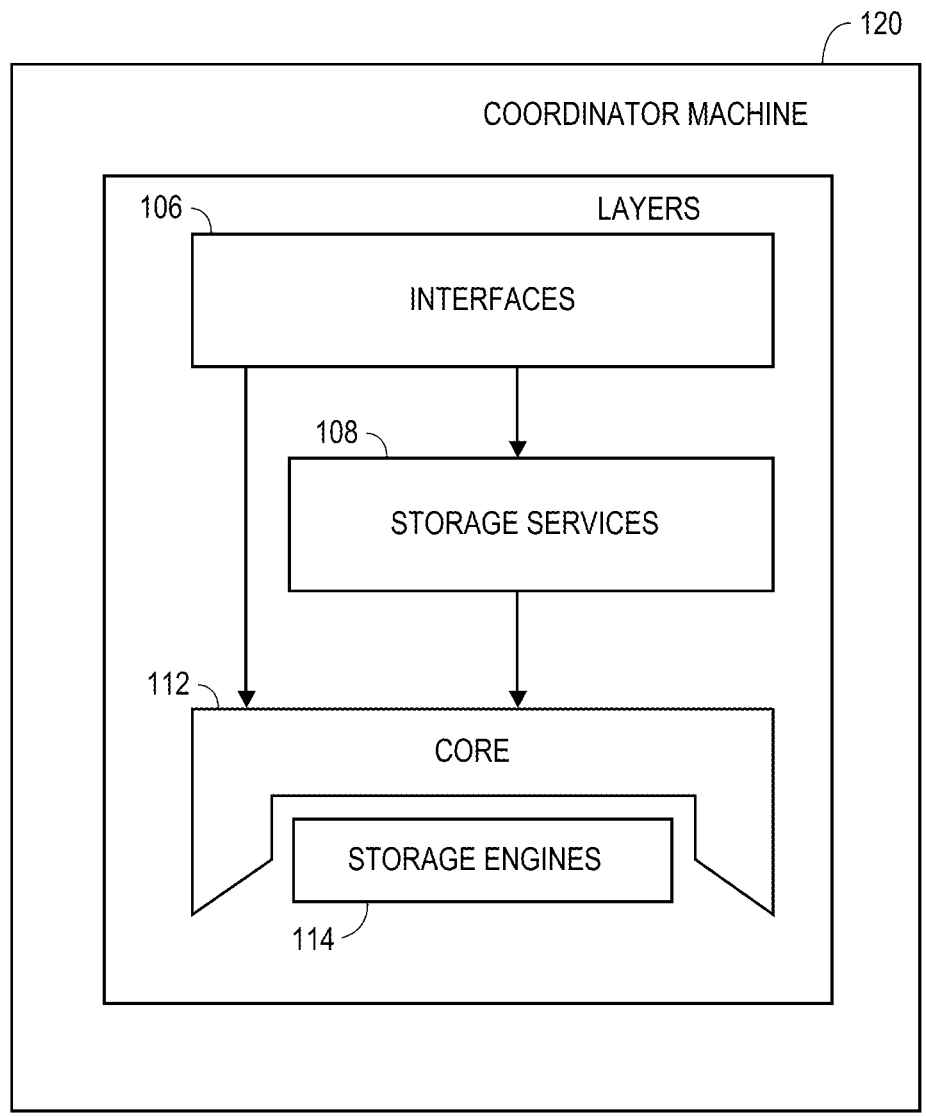
FIG. 1C depicts a representation of various layers supported by a coordinator machine in accordance with some embodiments.

FIG. 1C illustrates a more detailed representation of the coordinator machine 120 and various features that the coordinator machine 120 is capable of supporting or managing. Although only one coordinator machine 120 is depicted in FIG. 1C, it should be appreciated that each of the coordinator machines 120 of the management system 125 may include the same components and support the same services. As illustrated in FIG. 1C, the coordinator machine 120 supports four layers: an interfaces layer 106, a storage services layer 108, a core layer 112, and a storage engines layer 114.

Generally, the core layer 112 is configured to manage or process failure events, consistency models within the distributed database 105, routing functionality, topology management, intra- and inter-datacenter replication, and conflict resolution. The storage engines layer 114 is configured to convert and/or process data for storage on various physical memory devices (e.g., SSD, platter storage, or other memory). The storage services layer 108 supports applications or features that enable customers to manage the importing and storage of data within the distributed database 105. For example, some of the applications or features include batch importing, managing a strong consistency service, and managing a timeseries counters service. The intelfaces layer 106 manages how customers interact with the distributed database 105, such as customers interacting with the distributed database 105 via the clients 110.

Figure 2:
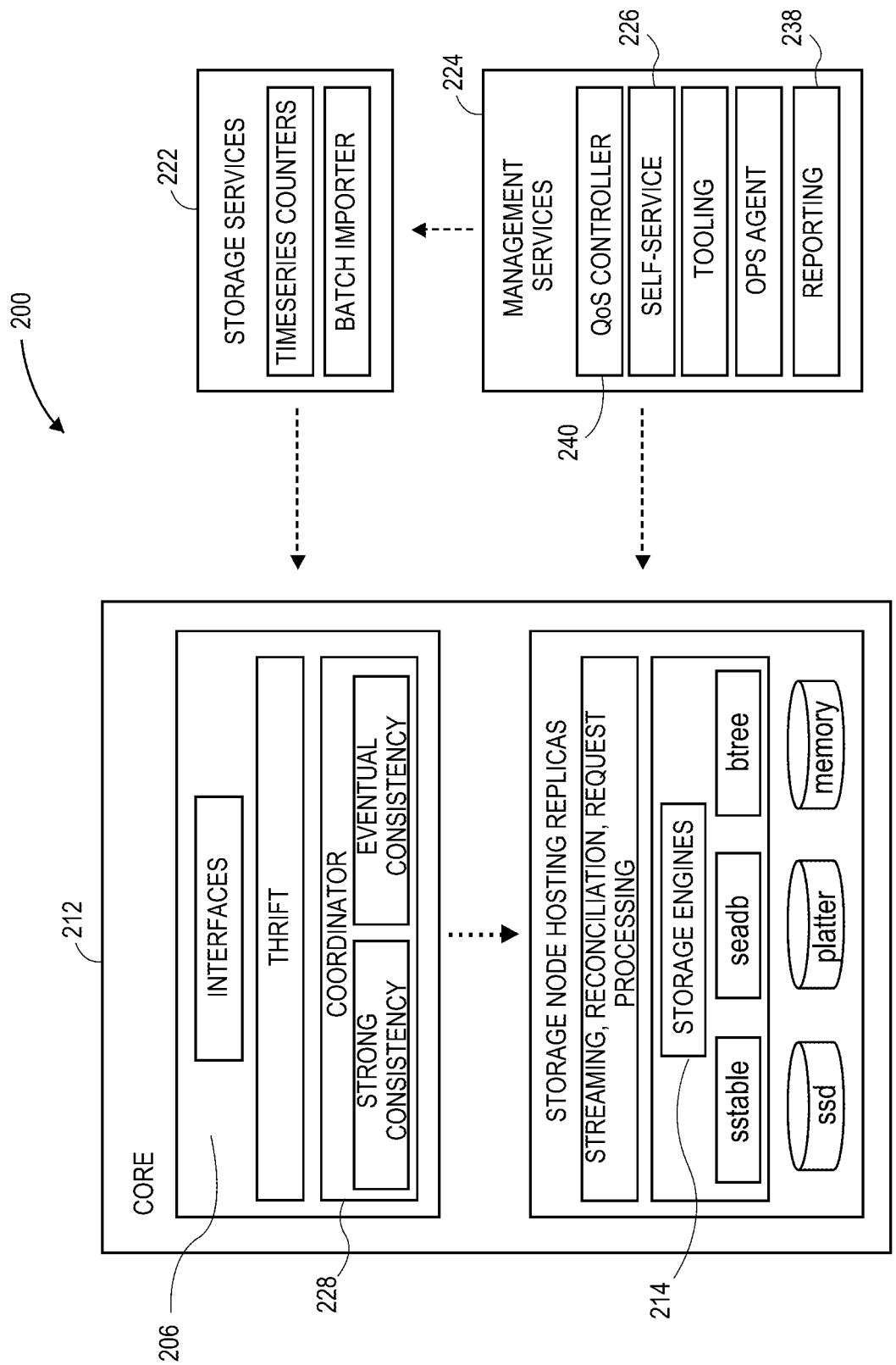
FIG. 2 depicts an example representation of entities and components associated with managing services of a multi-tenant distributed database in accordance with some embodiments.

FIG. 2 illustrates an example representation 200 of various applications and functionalities related to the distributed database system. The applications and functionalities may be managed by the coordinator machines 120 as described with respect to FIGS. 1B and 1C. In particular, the representation 200 identifies various modules managed by each of the coordinator machines 120, as well as communication paths among the modules, the layers, and the storage components associated with the distributed database system.

As illustrated in FIG. 2, the representation 200 includes a core layer 212 (such as the core layer 112 as discussed with respect to FIG. 1B), a storage services module 222, and a management services module 224. The core layer 212 may communicate with an intelfaces layer 206 (such as the interfaces layer 106 as discussed with respect to FIG. 1B) and a storage engines layer 214 (such as the storage engines layer 114 as discussed with respect to FIG. 1B). The management services module 224 is configured to communicate with the core layer 212, and includes various components, applications, modules, or the like that facilitate various systems and methods supported by the distributed database system. The storage services module 222 is also configured to communicate with the core layer 212, and also includes various components, applications, modules, or the like that facilitate additional systems and methods supported by the distributed database system.

The storage engines layer 214 is configured to manage data storage on the distributed database as well as maintain data structures in memory. The storage engine layer 214 supports at least three different storage engines: (1) seadb, which is a read-only file format for batch processed data (e.g., from a distributed system such as Apache Hadoop), (2) SSTable, a log-structured merge (LSM) tree-based format for heavy write workloads, and (3) b-tree, ab-tree based format for heavy read and light write workloads. Customers may directly or indirectly select an appropriate storage engine for processing datasets based on the service or use-case of the service.

For example, if the dataset is static and/or can be generated using a distributed system, the customer may want to select a read/only selection corresponding to the seadb storage engine. For further example, in the Twitter® social networking service, if the dataset changes dynamically, such as if the dataset includes tweets and Twitter® users, then the customer may want to select a read/write selection corresponding to the SSTable orb-tree storage engine. Generally, the b-tree storage engine is a better choice for a lot of data writes and the SSTable storage engine is a better choice for a lot of data reads. The management services module 224 initiates an appropriate workflow based on the selected storage engine. The management services module 224 further supports multiple types of clusters for storing datasets: a first, general cluster for storing general data as well as a second, production cluster for storing sensitive data.

The management services module 224 may further include a reporting module 238 configured for various reporting functionalities. The reporting module 238 may support an integration between the datasets being stored and external services and teams, and may enable the automatic reporting of certain usage of the distributed database system to the external services and teams. According to some embodiments, the reporting module 238 may support an API to a "capacity team," or a team tasked with managing the capacity of the distributed database system (generally, a moderator), such that the capacity team may manage customer usage, model capacity metrics, and collect raw data for customers. By managing the capacity of the system, the capacity team may effectively and efficiently manage the associated resources of the distributed database system. In some embodiments, the reporting module 238 may generate reports associated with data usage resulting from consistency model management.

In operation, if a customer creates, tests, or otherwise uses a service and the usage amount exceeds an amount of resources allocated to the customer, the management services module 224 places the service into a pending state and causes the reporting module 238 to automatically generate a service ticket that indicates the service's usage or requested usage, and provide the service ticket to the capacity team. The capacity team may examine the service ticket and interface with the customer to handle or manage the usage request. In particular, the capacity team may approve the increased capacity and enable the service use by the customer, or may reject the increased capacity.

The reporting module 238 may also generate a report if a customer's service exceeds a quota or threshold, along with details of the excess usage. The reporting module 238 may aggregate the reports such that, over time, the capacity team may analyze the usage data to generate resource planning recommendations. For example, the data from the aggregated reports may indicate that more resources are needed to handle the excess usage requests.

The management services module 224 further supports a "self-service" interface module 226 that enables customers to configure services or applications within the distributed database, as well as configure various functionalities related thereto, such as consistency model configurations. In particular, the self-service interface module 226 enables a customer to make selections, via various user interfaces, associated with initiating various services and applications supported by the distributed database as well as managing data stored in the distributed database. A customer may interface with the self-service interface module 226 via the user interface which the self-service interface module 226 may cause to be displayed on one of the plurality of clients 110 as discussed with respect to FIG. 1.

Generally, a customer may initiate various services or applications having associated use cases within the distributed database. FIG. 3 illustrates an example "start screen" 350 that details various options and features available to customers for using the distributed database. In another example, as illustrated in an interface 450 of FIG. 4A, the customer may select whether the use case of a desired service is associated with static data (451) or dynamic data (452). Based on the selection of static data or dynamic data, the management services module 224 may need to configure different consistency models and/or different clusters within the distributed database for the desired service.

FIG. 4B illustrates an additional interface 550 associated with initiating a service. In particular, the interface 550 of FIG. 4B indicates various clusters of the distributed database that are available for multi-tenant use. The interface 550 includes a name of the cluster, a description of the cluster, a type of the cluster (e.g., testing, production, etc.), identifications of one or more data centers that support the cluster, and an option for the customer to select a particular cluster.

FIG. 5A illustrates an interface 552 associated with configuring a new application or service that will utilize a specific cluster (such as one of the clusters depicted in FIG. 4B). The interface 552 enables a customer to input a name and description for the application. Similarly, an interface 554 illustrated in FIG. 5B enables the customer to input contact information as well as associate a team of engineers with the application. FIG. 5C illustrates an interface 556 that enables the customer to input various storage and throughput quotas for the application, such as storage space, peak keys written per second, peak partitioning keys read per second, and peak local keys read per second. It should be appreciated that additional storage and throughput quota parameters are envisioned. Moreover, an intelface 558 as illustrated in FIG. 5D enables the user to input traffic expectations for the application, such as whether the application will utilize a cache, and keys per second expectations. It should be appreciated that the interfaces 552, 554, 556, 558 of FIGS. 5A-5D are merely examples and that additional or alternative options, selections, and/or content are envisioned.

The self-service interface module 226 further enables the customer to select various functionalities associated with dataset management using the distributed database. In one particular case, the customer can select a rate limiting functionality to set rate limits (e.g., limits on queries per second) associated with data reads and/or data writes, which is described in further detail below. Further, the customer can configure custom alerts associated with meeting or exceeding rate limits. Still further, the customer can select to have reports detailing resource usage and other metrics generated (e.g., by the reporting module 238) at various time intervals or in response to various triggers. Moreover, the self-service interface can enable customers to modify certain parameters (e.g., increase or decrease resource usage limits) after a service is initiated.

According to present embodiments, the self-service intelface module 226 further enables the customer to select various consistency model configurations for a service. In general, distributed systems support a specific consistency model. When data is stored in a distributed system, the data must propagate among multiple computer resources or clusters before it has achieved replica convergence across the distributed system. Certain consistency models have benefits and drawbacks when compared to other consistency models. As discussed herein, an eventually consistent database enables users to store and retrieve data without delay. However, because there is no delay in retrieving data, there is not a guarantee that the retrieved data is completely up-to-date (i.e., is consistent across the distributed system). In contrast, a strongly consistent database requires that all resources or clusters have the same view of stored data.

Accordingly, when a user retrieves certain data, that data is guaranteed to be up-to-date, though with a higher read latency, a lower read throughput, and the potential for more failures.

For most tasks and applications supported by a given service, having an eventually consistent database is sufficient. For example, a user of the Twitter® social networking service may not want a long delay when opening his or her "tweet stream," but also may not mind (or may not notice) that all of the tweets posted to Twitter® in the last fractions of a second are not presented in the tweet stream. However, there may be some tasks in which a strongly consistent database is preferred. For example, Twitter® may require a strongly consistent database when storing Twitter® handles (i.e., usernames) so as to ensure that the same handle will not be assigned to multiple end users.

Referring back to FIG. 2, the interface layer 206 supports a coordinator module 228 that is configured to interface with the management services module 224 and manage consistency models within the distributed database system. In particular, a customer may interface with the self-service interface module 226 to specify the consistency model as well as various customization and configuration features associated therewith, for different applications and services to be supported by the distributed database system.

FIG. 6A illustrates an example interface 650 that enables a customer to specify whether a created service should be eventually consistent or strongly consistent. Accordingly, the customer is able to configure services with varying tradeoffs between availability (i.e., how quickly something can be read) and consistency (i.e., confidence that the retrieved data is up-to-date).

Referring to FIG. 6A, the interface 650 includes a data read selection 652 that enables the customer to specify a certain consistency model for data reads and a data write selection 654 that enables the customer to specify another (or the same) consistency model for data writes. The data read selection 652 and the data write selection 654 also enable the customer to specify multiple consistency models for data read and/or data write operations that are managed by the coordinator module 228.

Figure 6B:
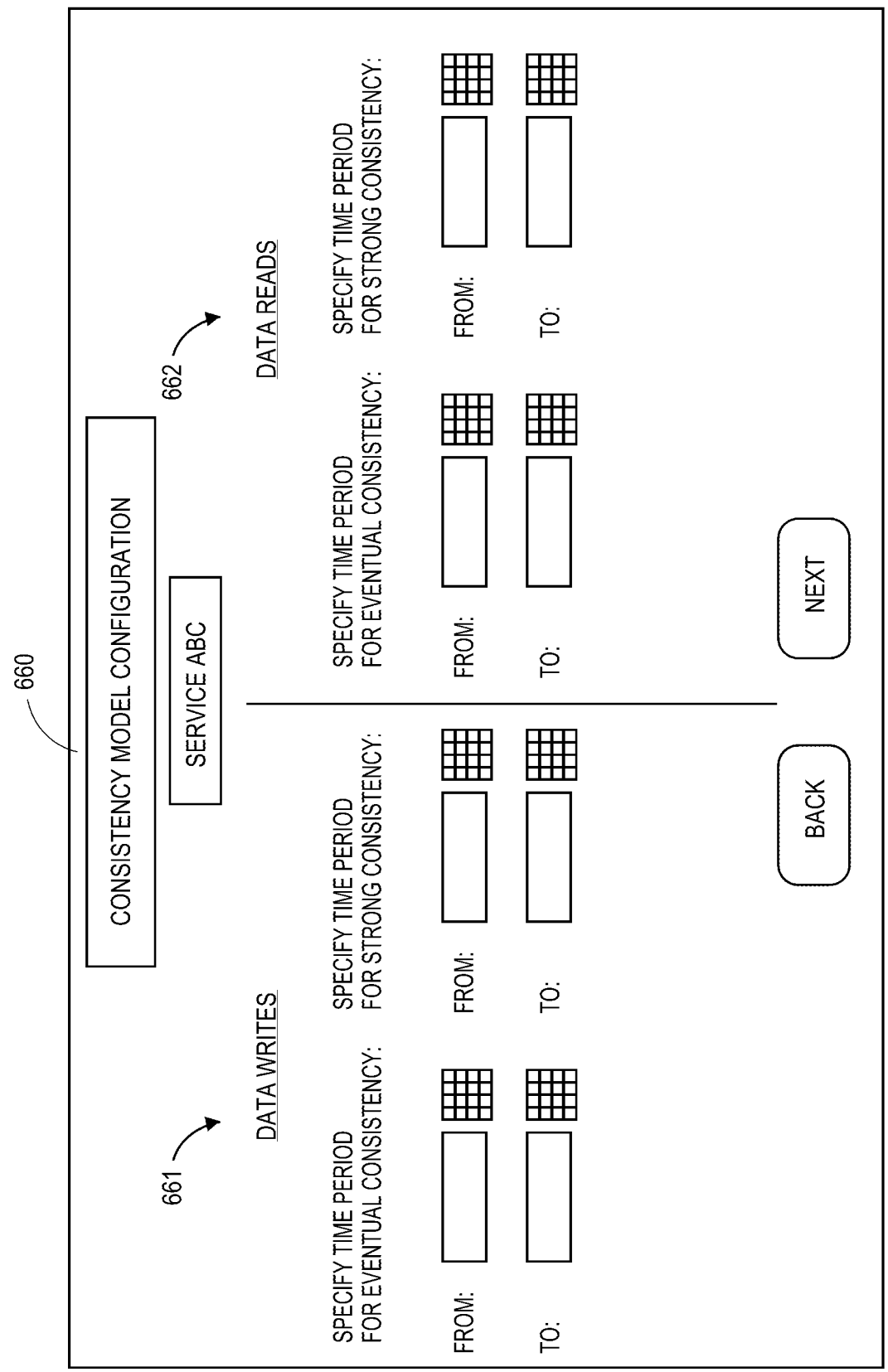

FIG. 6B illustrates an additional interface 660 that enables a customer to select how long a certain service should be strongly consistent and/or eventually consistent. The interface 660 includes a data write section 661 and a data read section 662 that each enables the customer to specify time periods for consistency models. In particular, the customer can interface with the data write section 661 to specify a time period for eventual consistency and another time period for strong consistency. Similarly, the customer can interface with the data read section 662 to specify a time period for eventual consistency and another time period for strong consistency.

As an example, a social networking service such as Twitter® may anticipate that there will be increased traffic during a popular live event such as the Super Bowl or an awards show such as the Academy Awards, and decreased traffic during off-peak hours (e.g., 1:00 AM-6:00 AM) in a certain time zone. The customer, therefore, may want an eventually consistent model during the popular live event to decrease data read latency and a strongly consistent model during off-peak hours to ensure data accuracy. In operation, the coordinator module 228 may manage the resources of the distributed database to ensure the proper consistency model for the specified time periods.

Figure 6C:
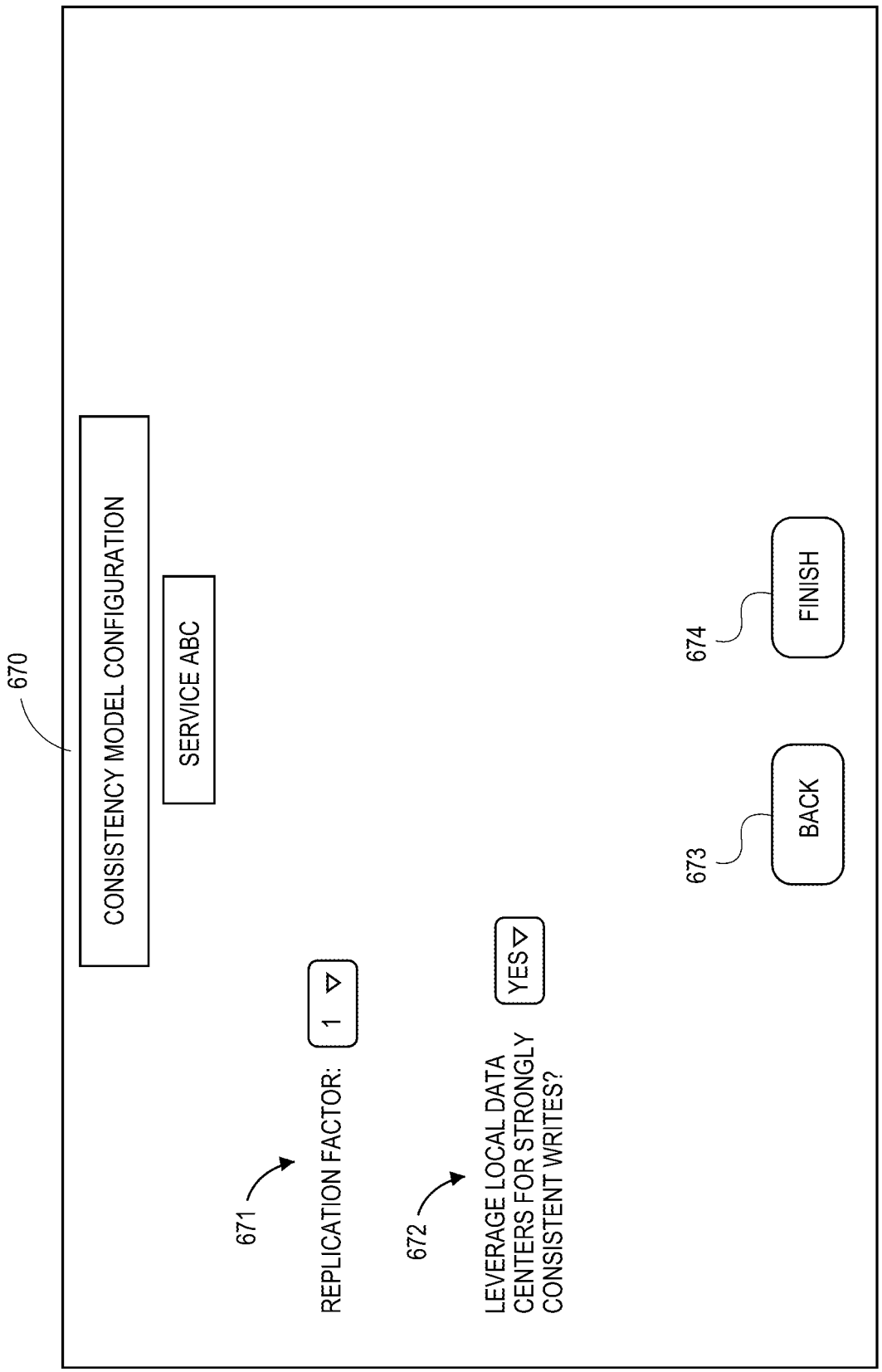

FIG. 6C illustrates a further interface 670 that enables a customer to specify additional customizations for a certain service. In particular, the interface 670 includes a replication factor selection 671 that enables a customer to select a replication factor for data writes (i.e., how many copies of the data are written to the clusters). In operation, if the replication factor is less than a total amount of the clusters, then the latency for data reads from the clusters may be reduced.

According to embodiments, the database may be distributed among multiple data centers, such as multiple local data centers, where each local data center may support various consistency models. Accordingly, the interface 670 may include a local data center selection 672 that enables the customer to select to leverage local data centers for strongly consistent writes. In operation, if database writes are strongly consistent for a local data center, then there is a guarantee that the data is up-to-date in that local data center but there is not a guarantee that the data is up-to-date across the quorum of remaining data centers. However, if the distributed database leverages local data centers for strongly consistent writes, the latency of database reads from all data centers may be reduced.

As an example, assume that there is a local data center in Atlanta and another local data center in San Francisco (as well as any additional data centers). Further, Twitter® has a "tweet button" feature present on a certain webpage, which enables end-users to quickly share that webpage to all of the end-user's followers via a pre-populated "tweet" containing a link to that webpage. A counter associated with a given tweet button will increment each time the end-user selects the button, and the website will display a current value of the counter. A strongly consistent write across all of the data centers may have too long of a latency to meet certain performance requirements. However, a strongly consistent write for the local data centers reduces the latency.

In operation, when a counter for a webpage is incremented (e.g., if an end-user selects the tweet button on that webpage), the corresponding Atlanta data center updates its counter along with an indication (e.g., a flag) of the update. Of course, the other local data centers may not yet store the most up-to-date counter value. When the counter for the webpage is additionally incremented (e.g., if another end-user selects the tweet button on that webpage), the corresponding San Francisco data center updates its counter along with an indication (e.g., a flag) of the update. In order to retrieve the updated counter value at read time, the management services module 224 may read the counter value stored at the Atlanta data center and the counter value stored at the San Francisco data center, and add the two counter values to determine the actual up-to-date counter value. Accordingly, the distributed database can effectively maintain an eventually consistent read to reduce latency while the data is asynchronously replicated across all data centers, while still being able to read up-to-date data values.

To support multiple services and multiple consistency models associated therewith, the distributed database enables multiple customers to use the same resources or cluster, whereby each customer is allotted a certain amount of the resources or cluster. In some scenarios, a customer may actually need more resources than what is originally envisioned by the customer and/or what is originally allocated to the customer. A conventional system having resources dedicated for individual customer use would reject a request for resource capacity that exceeds the originally allocated amount. However, because a multi-tenant system concurrently supports multiple use cases for multiple customers, it is likely that one or more of the customers is below a corresponding allocated capacity at a given time. Accordingly, the management services module 224 supports a rate-limiting service operated by a QoS controller 240 to manage customer usage of the resources or clusters of the distributed database across many metrics and ensure that no one service affects others on the system. In particular, the rate-limiting service may limit usage by certain of the customers and, in some cases, dynamically reallocate certain resources for certain of the customers to effectively utilize the total amount of resources or clusters within the distributed database.

As an example, assume that the distributed database is supporting ten (10) customers for various use cases. Each of the ten (10) customers has a corresponding allocated amount of resources whereby a sum of all of the allocated amount of resources may constitute the total resource capacity of the distributed database. Assume that two of the customers are each requesting access to an amount of resources that exceeds their respective allocated amounts. In this scenario, the QoS controller 240 may compare the amount of resources needed to handle the outstanding requests (i.e., a sum of the resources needed to handle requests of all of the customers) to the total resource capacity to determine whether there is any available resource capacity. If there is available capacity, then at least one of the customers is not using a respective amount of resources allocated to that customer. Accordingly, to maximize the total resource capacity of the system, the QoS controller 240 can allocate a portion of the unused resources for use by the two customers according to the access requests. In contrast, if there is not available capacity, then the QoS controller 240 may reject the requests for the excess resource allocation.

The QoS controller 240 is capable of distinguishing among various properties of allocated resources, and managing allocations and requests relating thereto. In particular, various properties of resources may include storage space, network bandwidth, CPU usage, and others. As an example, a customer may request a limit of 1,000 queries per second, but in operation only send 100 queries per second. However, the amount of data per query may be very large and more than what the QoS controller 240 is expecting, such that the total amount of information completely saturates the network bandwidth for the resources allocated to the customer. In this case, the QoS controller 240 may dynamically manage (e.g., rate limit) the allocated resources according to the network bandwidth of the queries even though the original request specified an amount of queries without indicating a corresponding data transmission amount.

After a customer specifies the various consistency model configurations for a service via the various interfaces (e.g., the interfaces of FIGS. 6A-6C), the QoS controller 224 determines whether the required amount of resources of the distributed database are available to support the service. If the required amount of resources are available, the QoS controller 224 instantiates the resources and enables the service to access the resources, whereby the coordinator module 228 manages the corresponding resources of the distributed database according to the configured consistency model. Of course, the customer can request additional resources for a particular application which the QoS controller 224 may additionally configure or instantiate.

Figure 7:
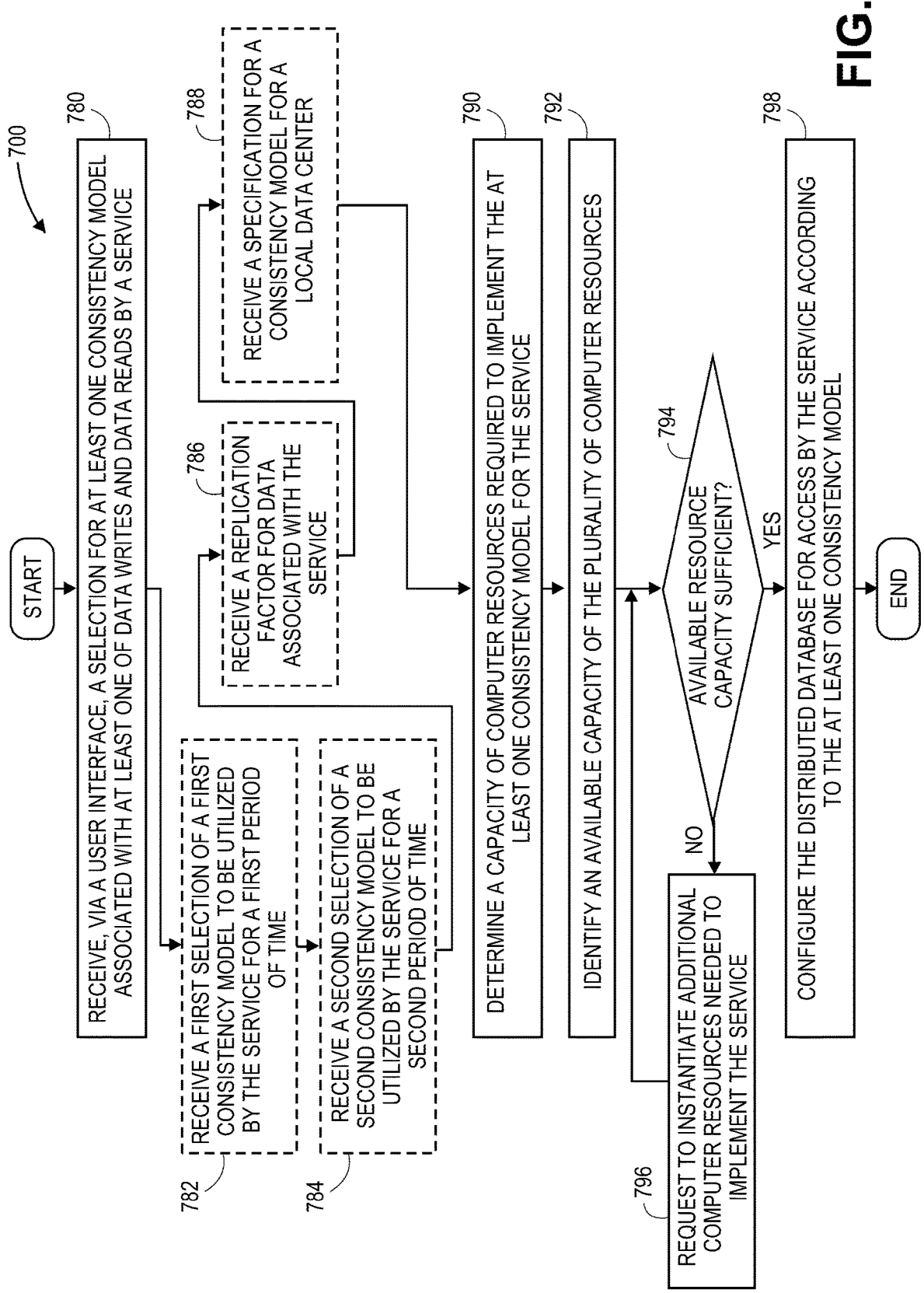
FIG. 7 depicts a flow chart of an example method for configuring a consistency model for a service supported by a multi-tenant distributed database in accordance with some embodiments.

FIG. 7 is a flowchart of a method 700 for an electronic device to manage a consistency model configuration for a service. It should be appreciated that various of the modules or entities, or combinations thereof, may implement and support the functionalities of the method 700. For example, one of the coordinator machines 120, or more specifically the coordinator module 228, may implement and facilitate the method 700. The order of the steps of the depicted flowchart of FIG. 7 can differ from the version shown, and certain steps can be eliminated, and/or certain other ones can be added, depending upon the implementation. According to embodiments, a customer may interface (e.g., via the self-service interface 226) with the electronic device to initiate a service supported by the distributed database and specify consistency model configurations for the service.

The method 700 begins with the electronic device receiving (780), via a user interface, a selection for at least one consistency model associated with at least one of data writes and data reads by the service. The consistency model may be strongly consistent, eventually consistent, or another consistency model. Further, the customer may specify one consistency model for data reads and another (or the same) consistency model for data writes. In an optional embodiment, the electronic device can receive (782) a first selection of a first consistency model to be utilized by the service for a first period of time. Further, the electronic device can optionally receive (784) a second selection of a second consistency model to be utilized by the service for a second period of time. The time periods may correspond to anticipated fluctuations in data writes and accesses, or to other factors. Further, the electronic device may enable the user to specify certain time periods for data reads and certain time periods for data writes.

In another optional embodiment, the electronic device can receive (786) a replication factor for data associated with the service. The replication factor may correspond to how many copies of the data are written to the clusters of the distributed database. Additionally, in an optional embodiment, the electronic device can receive (788) a specification for a consistency model for one or more local data centers. In operation, leveraging local data centers for strongly consistent writes may improve data availability and reduce data access latency.

After the customer has specified parameters for the at least one consistency model for the service, the electronic device can determine (790) a capacity of computer resources of the distributed database that is required to implement the at least one consistency model for the service. Further, the electronic device can identify (792) an available capacity of the plurality of computer resources. The available capacity may correspond to a portion of the computer resources that are not being used to support other services of other customers.

The electronic device can determine (794) whether the available resource capacity is sufficient. In some cases, if the available resource capacity is not sufficient ("NO"), the electronic device can request (796) to instantiate additional computer resources needed to implement the service according to the selected consistency model configuration. In contrast, if the available resource capacity is sufficient ("YES"), the electronic device can configure (798) the distributed database for access by the service according to the at least one consistency model. In particular, the electronic device can instantiate or otherwise allocate the required computer resources for use by the service.

Figure 8:
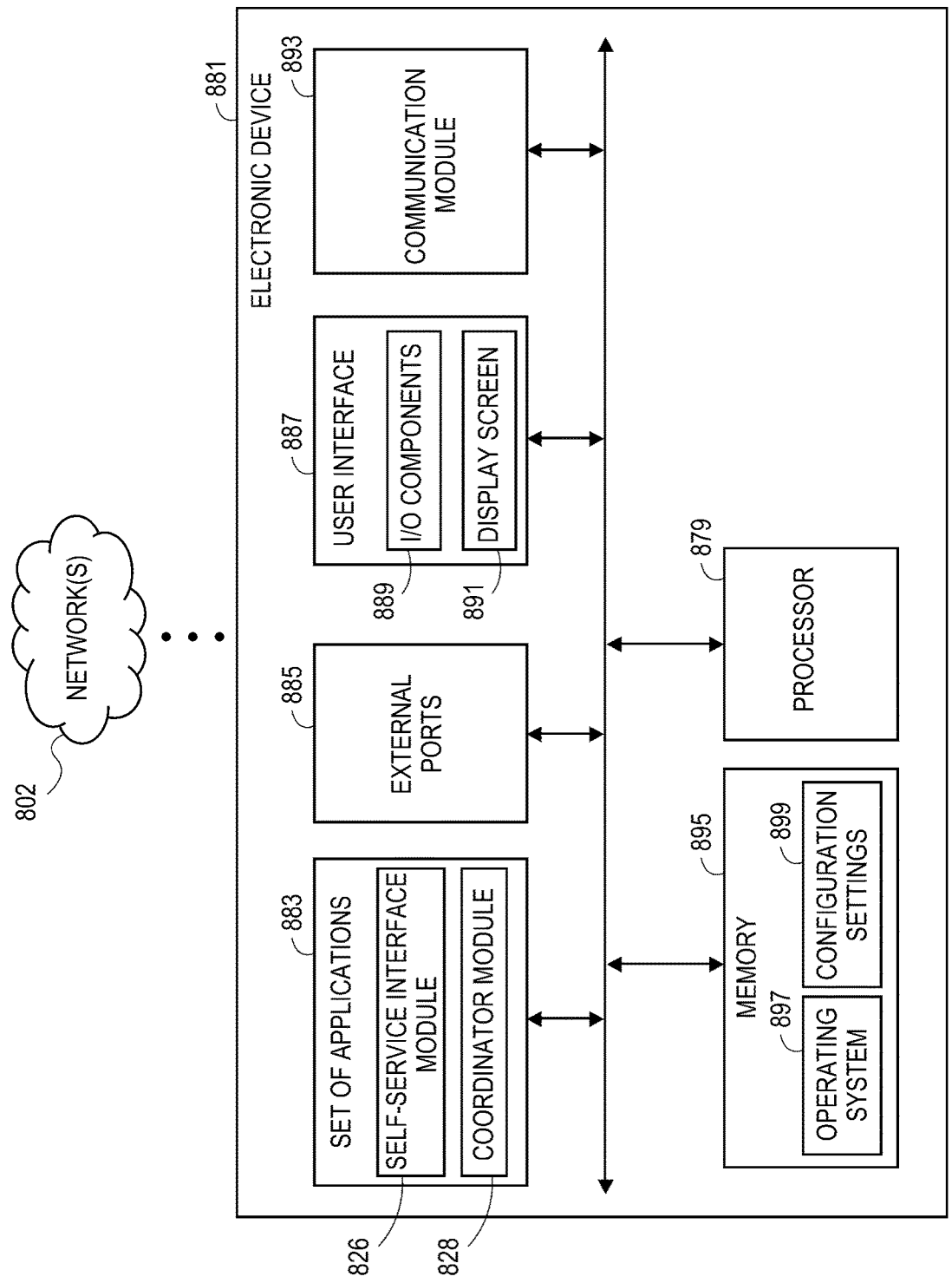
FIG. 8 depicts a hardware diagram of an electronic device in accordance with some embodiments.

FIG. 8 illustrates an example electronic device 881 in which the functionalities as discussed herein may be implemented. In some embodiments, the electronic device 881 may be one of the coordinator machines 120 and/or one of the clients 110 as discussed with respect to FIG. 1B. Generally, the electronic device 881 is a dedicated computer machine, workstation, or the like, including any combination of hardware and software components.

The electronic device 881 can include a computer processor 879 or other similar type of controller module or microcontroller, as well as a memory 895. The memory 895 can store an operating system 897 capable of facilitating the functionalities as discussed herein. The processor 879 can interface with the memory 895 to execute the operating system 897 and a set of applications 883. The set of applications 883 (which the memory 895 can also store) can include a self-service interface module 826 configured to facilitate the customer interaction functionalities as discussed herein and a coordinator module 828 configured to manage the consistency models as discussed herein. It should be appreciated that the set of applications 883 can include one or more other applications or modules not depicted in FIG. 8.

Generally, the memory 895 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 881 can further include a communication module 893 configured to interface with one or more external ports 885 to communicate data via one or more networks 802. For example, the communication module 893 can leverage the external ports 885 to establish a wide area network (WAN) or a local area network (LAN) for connecting the electronic device 881 to other components such as resources of a distributed database. According to some embodiments, the communication module 893 can include one or more transceivers functioning in accordance with IEEE standards, 3GPP standards, or other standards, and configured to receive and transmit data via the one or more external ports 885. More particularly, the communication module 893 can include one or more wireless or wired WAN and/or LAN transceivers configured to connect the electronic device 881 to WANs and/or LANs.

The electronic device 881 may further include a user interface 887 configured to present information to the user and/or receive inputs from the user. As illustrated in FIG. 8, the user interface 887 includes a display screen 891 and I/O components 889 (e.g., capacitive or resistive touch sensitive input panels, keys, buttons, lights, LEDs, cursor control devices, haptic devices, and others).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 879 (e.g., working in connection with the operating system 897) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method comprising:
provoking multiple services, each initiated by a respective one of multiple customers, for managing data comprising one or more data elements across multiple distributed database replicas of a multi-tenant distributed database, wherein each of the multiple services is associated with a consistency model for the service over a period of time, wherein each of the consistency models specifies: (i) a read consistency of the data when data is read by different clients during data operations performed on the data, and (ii) a write consistency of the data when data is modified during data operations performed on the data;
wherein providing each service of the multiple services comprises:
receiving, at an initial time, from the customer that initiated the service, an input specifying a consistency model for the service;
receiving requests from one or more clients to perform data operations on the one or more data elements, and
responding to the requests by performing the data operations with the read and write consistency specified in the consistency model; and
while providing the service:
receiving, at a first time later than the initial time, a first input from the customer that initiated the service to change the consistency model for the service from a first consistency model to a second consistency model; and
performing data operations of the service after the first time with the read and write consistency specified in the second consistency model.

2. The method of claim 1, wherein receiving the first input comprises receiving an input to change the consistency model from a first type of consistency model to a second type of consistency model.

3. The method of claim 2, wherein each of the first and second types of consistency model is either strong consistency or eventual consistency.

4. The method of claim 1, wherein the consistency model for the service comprises:
a write consistency model specifying the write consistency across the multiple distributed database replicas for the data as the one or more data elements stored across the multiple distributed database replicas are modified during a data write operation, and
a read consistency model specifying a read consistency for the data as the one or more data elements are read from the multiple distributed database replicas of the distributed database during a data read operation.

5. The method of claim 4,
wherein receiving the first input comprises receiving an input specifying a type of consistency model for the write consistency model; and wherein changing the consistency model for the service comprises modifying the write consistency model to the type of consistency model specified by the first input, whereby while the service is running after the first time, the data write operations performed while providing the service are performed with the write consistency specified in the type of consistency model specified by the first input.

6. The method of claim 4,
wherein receiving the first input comprises receiving an input specifying a type of consistency model for the read consistency model; and
wherein changing the consistency model for the service comprises modifying the read consistency model to the type of consistency model specified by the first input, whereby while the service is running after the first time, data read operations performed while providing the service are performed with the read consistency specified in the type of consistency model specified by the first input.

7. The method of claim 1, further comprising:
receiving a second input specifying (i) a future time period during which the service is provided and (ii) a third consistency model; and
modifying a consistency model in effect during the future time period to be the third consistency model while providing the service during the future time period, whereby while the service is running, the data operations performed while providing the service during the future time period are performed with a read and write consistency specified in the third consistency model.

8. A system comprising:
one or more computers and one or more storage devices on which are stored instructions that are operable, when executed by the one or more computers, to cause the one or more computers to perform operations comprising:
providing multiple services, each initiated by a respective one of multiple customers, for managing data comprising one or more data elements across multiple distributed database replicas of a multi-tenant distributed database, wherein each of the multiple services is associated with to a consistency model for the service over a period of time, wherein each of the consistency models specifies: (i) a read consistency of the data when data is read by different clients during data operations performed on the data, and (ii) a write consistency of the data when data is modified during data operations performed on the data;
wherein providing each service of the multiple services comprises:
receiving, at an initial time, from the customer that initiated the service, an input specifying a consistency model for the service;
receiving requests from one or more clients to perform data operations on the one or more data elements, and
responding to the requests by performing the data operations with the read and write consistency specified in the consistency model; and
while providing the service:
receiving, at a first time later than then initial time, a first input from the customer that initiated the service to change the consistency model for the service from a first consistency model to a second consistency model; and performing data operations of the service after the first time with the read and write consistency specified in the second consistency model.

9. The system of claim 8,
wherein receiving the first input comprises receiving an input to change the consistency model from a first type of consistency model to a second type of consistency model.

10. The system of claim 9, wherein each of the first and second types of consistency model is either strong consistency or eventual consistency.

11. The system of claim 8, wherein the consistency model for the service comprises:
a write consistency model specifying the write consistency across the multiple distributed database replicas for the data as the one or more data elements stored across the multiple distributed database replicas are modified during a data write operation, and
a read consistency model specifying a read consistency for the data as the one or more data elements are read from the multiple distributed database replicas of the distributed database during a data read operation.

12. The system of claim 11,
wherein receiving the first input comprises receiving an input specifying a type of consistency model for the write consistency model; and
wherein changing the consistency model for the service comprises modifying the write consistency model to the type of consistency model specified by the first input, whereby while the service is running after the first time, the data write operations performed while providing the service are performed with the write consistency specified in the type of consistency model specified by the first input.

13. The system of claim 11,
wherein receiving the first input comprises receiving an input specifying a type of consistency model for the read consistency model; and
wherein changing the consistency model for the service comprises modifying the read consistency model to the type of consistency model specified by the first input, whereby while the service is running after the first time, data read operations performed while providing the service are performed with the read consistency specified in the type of consistency model specified by the first input.

14. The system of claim 8, the operations further comprising:
receiving a second input specifying (i) a future time period during which the service is provided and (ii) a third consistency model; and
modifying a consistency model in effect during the future time period to be the third consistency model while providing the service during the future time period, whereby while the service is running, the data operations performed while providing the service during the future time period are performed with a read and write consistency specified in the third consistency model.

15. One or more non-transitory computer-readable storage media encoded with instructions that, when executed by one or more computers, cause the one or more computers to perform operations comprising:
providing multiple services, each initiated by a respective one of multiple customers, for managing data comprising one or more data elements across multiple distributed database replicas of a multi-tenant distributed database, wherein each of the multiple services is associated with a consistency model for the service over a period of time, wherein each of the consistency models specifies: (i) a read consistency of the data when data is read by different clients during data operations performed on the data, and (ii) a write consistency of the data when data is modified during data operations performed on the data;

wherein providing each service of the multiple services comprises:

receiving, at an initial time, from the customer that initiated the service, an input specifying a consistency model for the service;

receiving requests from one or more clients to perform data operations on the one or more data elements, and responding to the requests by performing the data operations with the read and write consistency specified in the consistency model; and while providing the service:

receiving, at a first time later than the initial time, a first input from the customer that initiated the service to change the consistency model for the service from a first consistency model to a second consistency model; and performing data operations of the service after the first time with the read and write consistency specified in the second consistency model.

16. The one or more computer-readable storage media of claim 15, wherein receiving the first input comprises receiving an input to change the consistency model from a first type of consistency model to a second type of consistency model.

17. The one or more computer-readable storage media of claim 16, wherein each of the first and second types of consistency model is either strong consistency or eventual consistency.

18. The one or more computer-readable storage media of claim 15, wherein the consistency model for the service comprises:

a write consistency model specifying the write consistency across the multiple distributed database replicas for the data as the one or more data elements stored across the multiple distributed database replicas are modified during a data write operation, and a read consistency model specifying a read consistency for the data as the one or more data elements are read from the multiple distributed database replicas of the distributed database during a data read operation.

19. The one or more computer-readable storage media of claim 18, wherein receiving the first input comprises receiving an input specifying a type of consistency model for the write consistency model; and wherein changing the consistency model for the service comprises modifying the write consistency model to the type of consistency model specified by the first input, whereby while the service is running after the first time, the data write operations performed while providing the service are performed with the write consistency specified in the type of consistency model specified by the first input.

20. The one or more computer-readable storage media of claim 18, wherein receiving the first input comprises receiving an input specifying a type of consistency model for the read consistency model; and wherein changing the consistency model for the service comprises modifying the read consistency model to the type of consistency model specified by the first input, whereby while the service is running after the first time, data read operations performed while providing the service are performed with the read consistency specified in the type of consistency model specified by the first input.

21. The one or more computer-readable storage media of claim 15, the operations further comprising:

receiving a second input specifying (i) a future time period during which the service is provided and (ii) a third consistency model; and modifying a consistency model in effect during the future time period to be the third consistency model while providing the service during the future time period, whereby while the service is running, the data operations performed while providing the service during the future time period are performed with a read and write consistency specified in the third consistency model.

22. The method of claim 1, wherein the consistency models for the multiple services are managed by a coordinator machine, wherein the coordinator machine is configured to provide a user interface for a customer to select, for a service that the customer initiated, one of two or more different storage engines included in the coordinator machine.

23. The method of claim 22, wherein the two or more different storage engines comprise two of: (i) a first storage engine configured to perform data operations using a read-only file format, (ii) a second storage engine configured to perform heavy data write operations using a log-structured merge tree-based format, or (iii) a third storage engine configured to perform heavy data read operations and light data write operations using b-tree or ab-tree based format.

24. The system of claim 8, wherein the consistency models for the multiple services are managed by a coordinator machine, wherein the coordinator machine is configured to provide a user interface for a customer to select, for a service that the customer initiated, one of two or more different storage engines included in the coordinator machine.

25. The system of claim 24, wherein the two or more different storage engines comprise two of: (i) a first storage engine configured to perform data operations using a read-only file format, (ii) a second storage engine configured to perform heavy data write operations using a log-structured merge tree-based format, or (iii) a third storage engine configured to perform heavy data read operations and light data write operations using b-tree or ab-tree based format.

26. The one or more computer-readable storage media of claim 15, wherein the consistency models for the multiple services are managed by a coordinator machine, wherein the coordinator machine is configured to provide a user interface for a customer to select, for a service that the customer initiated, one of two or more different storage engines included in the coordinator machine.

27. The one or more computer-readable storage media of claim 26, wherein the two or more different storage engines comprise two of: (i) a first storage engine configured to perform data operations using a read-only file format, (ii) a second storage engine configured to perform heavy data write operations using a log-structured merge tree-based format, or (iii) a third storage engine configured to perform heavy data read operations and light data write operations using b-tree or ab-tree based format.

* * * * *

UNITED STATES PATENT AND TRADEMARK OFFICE
CERTIFICATE OF CORRECTION

PATENT NO. : 11,269,819 B1
APPLICATION NO. : 16/357131
DATED : March 8, 2022
INVENTOR(S) : Peter Schuller et al.

It is certified that error appears in the above-identified patent and that said Letters Patent is hereby corrected as shown below:

On the Title Page

Column 1, item (71) (Applicant), delete "Twittter," and insert -- Twitter, --.

Column 2, item (56), (Other Publications), delete "2015):" and insert -- 2015: --.

In the Claims

Column 13, Line 44, Claim 8, delete "to a" and insert -- a --.

Signed and Sealed this
Thirtieth Day of August, 2022

Katherine Kelly Vidal
*Director of the United States Patent and Trademark Office*